(12) United States Patent
Kall et al.

(45) Date of Patent: *Mar. 3, 2020
(10) Patent No.: US 10,581,816 B2

(54) EXTERNAL AUTHENTICATION SUPPORT OVER AN UNTRUSTED NETWORK

(71) Applicant: NOKIA SOLUTIONS AND NETWORKS OY, Espoo (FI)

(72) Inventors: Anders Jan Olof Kall, Espoo (FI); Gyorgy Tamas Wolfner, Budapest (HU); Jouni Korhonen, Riihimäki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 25 days.

This patent is subject to a terminal disclaimer.

(21) Appl. No.: 15/427,819

(22) Filed: Feb. 8, 2017

(65) Prior Publication Data

US 2017/0149751 A1 May 25, 2017

Related U.S. Application Data

(63) Continuation of application No. 13/978,273, filed as application No. PCT/EP2011/050475 on Jan. 14, 2011, now Pat. No. 9,641,525.

(51) Int. Cl.
  *H04L 29/06* (2006.01)
  *H04L 12/66* (2006.01)
  (Continued)

(52) U.S. Cl.
  CPC .......... *H04L 63/061* (2013.01); *G06F 12/04* (2013.01); *H04L 9/08* (2013.01); *H04L 12/66* (2013.01);
  (Continued)

(58) Field of Classification Search
  CPC . H04L 63/061; H04L 63/083; H04L 63/0876; H04L 63/10; H04L 9/08;
  (Continued)

(56) References Cited

U.S. PATENT DOCUMENTS 8,046,829 B2 * 10/2011 Oba .................... H04L 63/08
  726/14
8,059,643 B1 11/2011 Shojayi et al.
(Continued)

FOREIGN PATENT DOCUMENTS

CN 101330740 A 12/2008
CN 101374055 A 2/2009
(Continued)

OTHER PUBLICATIONS

Indonesian Substantive Examination Report Stage 1 application No. WO00201302997 dated Apr. 17, 2017.
(Continued)

Primary Examiner — Cheng-Feng Huang
(74) Attorney, Agent, or Firm — Squire Patton Boggs (US) LLP

(57) ABSTRACT

There are provided measures for supporting an authentication to an external packet data network over an untrusted access network, said measures exemplarily comprising authenticating a user equipment to a communication network providing connectivity for the user equipment across an unsecured access network in response to a first authentication request, wherein the authentication request is an authentication request of a key information exchange mechanism and includes authentication data, receiving a second authentication request for authenticating the user equipment towards a packet data network external to the communications network. The measures may further comprise creating a binding update message including the authentication data and identity information of the user received from the user equipment.

13 Claims, 4 Drawing Sheets

(51) Int. Cl.
  *H04W 12/06* (2009.01)
  *G06F 12/04* (2006.01)
  *H04L 9/08* (2006.01)
  *H04L 12/46* (2006.01)

(52) U.S. Cl.
  CPC ........ *H04L 63/083* (2013.01); *H04L 63/0876* (2013.01); *H04L 63/10* (2013.01); *H04L 63/162* (2013.01); *H04L 63/205* (2013.01); *H04W 12/06* (2013.01); *H04L 12/4633* (2013.01)

(58) Field of Classification Search
  CPC . H04L 12/4633; H04L 63/162; H04L 63/205; H04L 12/66; G06F 12/04; H04W 12/06
  See application file for complete search history.

(56) References Cited

U.S. PATENT DOCUMENTS

| | | | |
|---|---|---|---|
| 8,270,978 | B1 | 9/2012 | Faccin et al. |
| 8,566,455 | B1* | 10/2013 | Zhao ............... H04W 76/15 709/227 |
| 2003/0028763 | A1* | 2/2003 | Malinen ............ H04L 63/062 713/155 |
| 2005/0055292 | A1 | 3/2005 | Kissner et al. |
| 2005/0078824 | A1* | 4/2005 | Malinen ............... H04L 63/08 380/247 |
| 2007/0159971 | A1 | 7/2007 | Zhang et al. |
| 2007/0250706 | A1* | 10/2007 | Oba .................... H04L 63/06 713/159 |
| 2008/0040606 | A1* | 2/2008 | Narayanan ........... H04L 63/08 713/169 |
| 2008/0072312 | A1 | 3/2008 | Takeyoshi et al. |
| 2008/0178277 | A1 | 7/2008 | Oba et al. |
| 2008/0316972 | A1 | 12/2008 | Shaheen |
| 2009/0022152 | A1 | 1/2009 | Henry et al. |
| 2009/0054037 | A1 | 2/2009 | Kaippallimalil |
| 2010/0035578 | A1 | 2/2010 | Ahmed |
| 2010/0124198 | A1* | 5/2010 | Wong ................ H04W 60/005 370/329 |
| 2010/0125732 | A1* | 5/2010 | Cha .................... H04L 63/107 713/166 |
| 2010/0199332 | A1 | 8/2010 | Bachmann et al. |
| 2010/0323700 | A1 | 12/2010 | Bachmann et al. |
| 2011/0246629 | A1* | 10/2011 | Savolainen ........ H04W 60/005 709/220 |

FOREIGN PATENT DOCUMENTS

| | | |
|---|---|---|
| EP | 2 169 849 A1 | 3/2010 |
| RU | 2 354 066 C2 | 4/2009 |
| WO | 2009/041773 A2 | 4/2009 |
| WO | 2010/034483 A1 | 4/2010 |
| WO | 2011/137928 A1 | 11/2011 |

OTHER PUBLICATIONS

LG Electronics; 3GPP TSG WG2 Meeting #80; TD S2-103342; "Non-Transparent Access to Private Networks Via Non-3GPP Access", Aug. 30-Sep. 3, 2010, pp. 1-7.
P. Eronen et al., Network Working Group Request for Comments: 4739; "Multiple Authentication Exchanges in the Internet Key Exchange (IKEv2) Protocol", Nov. 2006, pp. 1-11.
Chinese Office Action application No. 201180064887.5 dated May 27, 2017.
Japanese Office Action and its English Language Translation issued in corresponding JP Application No. 2015-195680, dated Aug. 25, 2016. (No copy provided, per MPEP 609. Copy submitted in parent U.S. Appl. No. 13/978,273).
Chinese Office Action issued in corresponding CN Application No. 201180064887.5, dated Sep. 14, 2016. (No copy provided, per MPEP 609. Copy submitted in parent U.S. Appl. No. 13/978,273).
Examination Report dated Oct. 13, 2015, issued in corresponding AU Application No. 2011355322. (No copy provided, per MPEP 609. Copy submitted in parent U.S. Appl. No. 13/978,273).
Notice of Allowance dated Oct. 14, 2015, issued in corresponding Russian Patent Application No. 2013137968. (No copy provided, per MPEP 609. Copy submitted in parent U.S. Appl. No. 13/978,273).
Office Action dated Mar. 24, 2015, issued in corresponding CP Patent Application No. 201180064887.5. (No copy provided, per MPEP 609. Copy submitted in parent U.S. Appl. No. 13/978,273).
3GPP TSG SA WG2 Meeting #82, S2-105490 (Revision of S2-104951), Nov. 15-19, 2010, Jacksonville, FL (pp. 1-8). (No copy provided, per MPEP 609. Copy submitted in parent U.S. Appl. No. 13/978,273).
LG Electronics, "Non-transparent access to private networks via non-3GPP access", 3GPP TSG SA WG2 Meeting #80, TD S2-103342, Aug. 30-Sep. 3, 2010, Brunstad, Norway. 7 Pages. (No copy provided, per MPEP 609. Copy submitted in parent U.S. Appl. No. 13/978,273).
International Search Report and Written Opinion dated May 13, 2011 corresponding to International Patent Application No. PCT/EP2011/050475. (No copy provided, per MPEP 609. Copy submitted in parent U.S. Appl. No. 13/978,273).
P. Eronen et al., "Multiple Authentication Exchanges in the Internet Key Exchange (IKEv2) Protocol," Network Working Group, RFC 4739, Nov. 1, 2006, pp. 1-11. (No copy provided, per MPEP 609. Copy submitted in parent U.S. Appl. No. 13/978,273).
3GPP TS 33.234 V.10.0.0 (Oct. 2010), Technical Specification Group Service and System Aspects; 3 G Security; Wireless Local Area Network (WLAN) interworking security (Release 10), Oct. 2010, 102 pages. (No copy provided, per MPEP 609. Copy submitted in parent U.S. Appl. No. 13/978,273).
3GPP TS 33.402 V.10.0.0 (Dec. 2010), 3GPP; Technical Specification Group Services ans System Aspects; 3GPP System Architecture Evolution (SAE); Security aspects of non-3GPP accesses (Release 10), Dec. 2010, 47 pages. (No copy provided, per MPEP 609. Copy submitted in parent U.S. Appl. No. 13/978,273).
3GPP TS 23.234 V9.0.0 (Dec. 2009) Technical Specification 3rd Generation Partnership Project; Technical Specification Group Services and System Aspects; 3GPP system to Wireless Local Area Network (WLAN) interworking; System description (Release 9), Dec. 2009, 84 pages. (No copy provided, per MPEP 609. Copy submitted in parent U.S. Appl. No. 13/978,273).
3GPP TS 23.060 V10.2.0 (Dec. 2010), Technical Specification 3rd Generation Partnership Project; Technical Specification Group Services and System Aspects; General Packet Radio Service (GPRS); Service description; Stage 2 (Release 10), Dec. 2010, 316 pages. (No copy provided, per MPEP 609. Copy submitted in parent U.S. Appl. No. 13/978,273).
3GPP TS 29.061 V10.1.0 (Dec. 2010) Technical Specification 3rd Generation Partnership Project; Technical Specification Group Core Network and Terminals; interworking between the Public Land Mobile Network (PLMN) supporting packet based services and Packet Data Networks (PDN) (Release 10), Dec. 2010, 155 pages. (No copy provided, per MPEP 609. Copy submitted in parent U.S. Appl. No. 13/978,273).
3GPP TS 23.402 V10.2.0 (Dec. 2010)3GPP; Technical Specification Group Services and System Aspects; Architecture enhancements for non-3GPP accesses (Release 10), Dec. 2010, 10 pages. (No copy provided, per MPEP 609. Copy submitted in parent U.S. Appl. No. 13/978,273).
LG Electronics, "Access to Private Networks with S2b," 3GPP TSG WG2 Meeting #82, TD S2-105489 Nov. 15-19, 2010, pp. 1-4. (No copy provided, per MPEP 609. Copy submitted in parent U.S. Appl. No. 13/978,273).
Nokia Siemens Network, "Introducing User Credentials in PCO for S2b," 3GPP TSG SA WG2 Meeting #79, S2-102594, May 10-14, 2010, 7 pages. (No copy provided, per MPEP 609. Copy submitted in parent U.S. Appl. No. 13/978,273).
Chinese Office Action dated Jan. 25, 2017, issued in corresponding CN Application No. 201180064887.5.
Japanese Office Action Final Notification of Reasons for Rejection application No. 2015-195680 dated Mar. 6, 2017.
European Office Action issued in corresponding European Patent Application No. 11 700 419.2 dated Sep. 25, 017.

(56) References Cited

OTHER PUBLICATIONS

Substantive Examination Report Stage II dated Dec. 20, 2017 corresponding to Indonesian Patent Application No. WO0201302997, and English translation thereof.
Indian Examination Report corresponding to Application No. 5861/DELNP/2013, dated Jan. 31, 2019.

* cited by examiner

EXTERNAL AUTHENTICATION SUPPORT OVER AN UNTRUSTED NETWORK

CROSS-REFERENCE TO RELATED APPLICATION:

This application is a continuation of co-pending U.S. patent application Ser. No. 13/978,273 filed on Jul. 3, 2013, which is the national stage application based on PCT International Application No. PCT/EP2011/050475, filed on Jan. 14, 2011. The entire disclosures of these earlier applications are hereby incorporated herein by reference.

FIELD OF THE INVENTION

The present invention relates to apparatuses, methods and a computer program product for external authentication support over an untrusted network, for example over an untrusted non-3GPP network.

RELATED BACKGROUND ART

The following meanings for the abbreviations used in this specification apply:
3GPP $3^{rd}$ generation partnership project
AAA Authentication, Authorization, and Accounting
APN Access point name
CHAP Challenge Handshake Authentication Protocol
EAP Extensible Authentication Protocol
EAP-GTC EAP general token card
eNode-B LTE base station (also referred to as eNB)
EPC Evolved Packet Core
ePDG Evolved Packet Data Gateway
GGSN Gateway GPRS Support Node
GPRS General Packet Radio Service
GTPv2 GPRS Tunnelling Protocol version 2
IDi Identification—initiator
IDr Identification—responder
IETF Internet Engineering Task Force
IKEv2 Internet Key Exchange version 2
IP Internet protocol
IPSec Internet Protocol Security
LCP Link control protocol
LTE Long term evolution
LTE-A LTE-Advanced
MN Mobile node
MSISDN Mobile station integrated services data network
MT mobile terminal
PAP Password Authentication Protocol
PCO Protocol Configuration Options
PDG Packet Data Gateway
PDN Packet data network
PDP Packet data protocol
PGW PDN Gateway (PDN GW)
PMIPv6 Proxy MIPv6
PPP Point-to-point protocol
TE Terminal equipment
UE User equipment The present specification basically relates to the 3GPP Evolved Packet System (EPS), more specifically to the scenario when a UE is connected to the EPC via an untrusted Non-3GPP Access Network. When a UE is connected to the EPC (evolved packet core) via an untrusted Non-3GPP Access Network, there is an IPSec tunnel between the UE and the 3GPP network to have secure communication. The IPSec tunnel end-point in the 3GPP network is the ePDG (evolved packet data gateway). IKEv2 is used between the UE and the ePDG to establish the IPSec tunnel.

In GPRS, for example as specified in 3GPP TS 23.060 and in EPS when the UE is connected to the 3GPP Packet Core network via a 3GPP access or a trusted non-3GPP Access Network an authentication with an external AAA server using PAP or CHAP is possible. The details of this external authentication are specified for example in 3GPP TS 29.061.

The external authentication requires the exchange of authentication information between the UE and the external AAA server.

For this purpose, Protocol Configuration Options (PCO) information elements are specified, which can be used to carry user credentials between the UE and the core network when the UE is attached to a 3GPP access network. The user credentials are e.g. user name and user password within PAP or CHAP parameters (PAP: Password Authentication Protocol, CHAP: Challenge-Handshake Protocol).

When a UE is connected to the EPC via an untrusted non-3GPP access network, there is an IPSec tunnel between the UE and the 3GPP network to establish a secure communication. The endpoint of the IPSec tunnel at the side of the 3GPP network is the ePDG (evolved Packet Data Network). For example, IKEv2 (Internet Key Exchange version 2) is used between the UE and the ePDG to establish the IPSec tunnel.

However, currently, there is no solution how to carry user credentials between the UE using untrusted non-3GPP access and the core network, and there is no PCO mechanism or the like defined between the UE and ePDG.

In view of the above, there are no feasible mechanisms for providing the ePDG with required authentication data to be used when authenticating a UE's access to an external network via an untrusted access network.

Accordingly, there is a demand for mechanisms for an external authentication support over untrusted access, i.e. for supporting an authentication to an external packet data network over an untrusted access network.

SUMMARY OF EMBODIMENTS OF THE INVENTION

Embodiments of the present invention aim at addressing at least part of the above issues and/or problems.

Embodiments of the present invention are made to provide for mechanisms for an external authentication support over untrusted access, i.e. for supporting an authentication to an external packet data network over an untrusted access network.

According to an exemplary first aspect of the present invention, there is provided . . .

According to an exemplary first aspect of the present invention, there is provided a method comprising creating a first authentication request for authenticating a user equipment towards a communication network providing connectivity for the user equipment across an unsecured access network, wherein the authentication request is an authentication request of a key information exchange mechanism and authentication data is inserted in the authentication request, sending the first authentication request for authenticating the user equipment with the communication network based on the authentication data, creating, after authentication with the communication network, a second authentication request for authenticating the user equipment towards a packet data network external to the communications network, and sending the second authentication request.

According to further developments or modifications thereof, one or more of the following applies:

the method may further comprise receiving, before sending the first authentication request, an indication that multiple authentications are supported, and inserting in the first authentication request an indication that multiple authentications are supported;

the method may further comprise sending a request including an identity of the user equipment; and/or the method may further comprise receiving an authentication response including configuration parameters.

According to an exemplary second aspect of the present invention, there is provided a method comprising receiving an first authentication request for authenticating a user equipment towards a communication network providing connectivity for the user equipment across an unsecured access network, wherein the authentication request is an authentication request of a key information exchange mechanism and includes authentication data, authenticating the user equipment with the communication network based on the authentication data, receiving a second authentication request for authenticating the user equipment towards a packet data network external to the communications network from the user equipment, creating a binding update message including the authentication data and identity information of the user received from the user equipment, and sending the binding update message to a gateway apparatus of the packet data network.

According to further developments or modifications thereof, one or more of the following applies:

the authentication data may be included in a dedicated information element in the binding update message;

the authentication data may be included in a protocol configuration options information element in the binding update message;

a plurality of information elements may be provided in the binding update message including an password information element, an authentication protocol challenge information element and/or a username information element;

the method may further comprise sending, before receiving the first authentication request, an indication that multiple authentication are supported, wherein the first authentication request includes an indication that multiple authentications are supported;

the method may further comprise receiving, from the user equipment, a request including an identity of the user equipment; and/or the method may further comprise receiving a binding update response from the gateway apparatus including configuration parameters, and sending an authentication response including configuration parameters to the user equipment.

According to an exemplary third aspect of the present invention, there is provided a method comprising receiving a binding update message including identity information and authentication data, the identity information and the authentication data serving for authenticating a user equipment towards a packet data network, creating an access request based on the identity information and authentication data, and sending the access request message to a network authentication element.

According to further developments or modifications thereof, one or more of the following applies:

the authentication data may be included in a dedicated information element in the binding update message;

the authentication data may be included in a protocol configuration options information element in the binding update message;

a plurality of information elements may be provided in the binding update message including an authentication protocol password information element, an authentication protocol challenge information element, a password information element and/or a username information element; and/or the method may further comprise sending a binding update response including configuration parameters in response to the binding update message.

According to an exemplary fourth aspect of the present invention, there is provided a method comprising sending, from a user equipment to a first gateway apparatus, a first authentication request for authenticating a user equipment towards a communication network providing connectivity for the user equipment across an unsecured access network, wherein the first authentication request is an authentication request of a key information exchange mechanism and includes authentication data, authenticating the user equipment with the communication network based on the authentication data, sending, from the user equipment to the first gateway apparatus, a second authentication request for authenticating the user equipment towards a packet data network external to the communications network, creating a binding update message including the authentication data and identity information of the user received from the user equipment, and sending the binding update message from the first gateway apparatus to a second gateway apparatus of the packet data network.

According to further developments or modifications thereof, one or more of the following applies:

the method may further comprise sending an access request based on the identity information and authentication data from the second gateway apparatus to a network authentication element, and receiving, at the second gateway apparatus, an access accept message from the network authentication element; and/or the method may further comprise sending a binding update response including configuration parameters from the second gateway apparatus to the first gateway apparatus, and sending an authentication response including configuration parameters from the first gateway apparatus to the user equipment.

According to an exemplary fifth aspect of the present invention, there is provided an apparatus comprising a processor configured to create a first authentication request for authenticating a user equipment towards a communication network providing connectivity for the user equipment across an unsecured access network, wherein the authentication request is an authentication request of a key information exchange mechanism and authentication data is inserted in the authentication request, an interface configured to send the first authentication request for authenticating the user equipment with the communication network based on the authentication data, wherein the processor is further configured to create, after authentication with the communication network, a second authentication request for authenticating the user equipment towards a packet data network external to the communications network, and wherein the interface is further configured to send the second authentication request.

According to further developments or modifications thereof, one or more of the following applies:

the processor may be configured to receive, before sending the first authentication request, an indication that multiple authentications are supported, and the processor may be configured to insert in the first authentication request an indication that multiple authentications are supported;

the interface may be configured to send a request including an identity of the user equipment; and/or the interface may be configured to receive an authentication response including configuration parameters.

According to an exemplary sixth aspect of the present invention, there is provided an apparatus comprising an interface configured to receive a first authentication request for authenticating a user equipment towards a communication network providing connectivity for the user equipment across an unsecured access network, wherein the authentication request is an authentication request of a key information exchange mechanism and includes authentication data, and a processor configured to authenticate the user equipment with the communication network based on the authentication data, wherein the interface is further configured to receive a second authentication request for authenticating the user equipment towards a packet data network external to the communications network from the user equipment, the processor is further configured to create a binding update message including the authentication data and identity information of the user equipment received from the user equipment, wherein the interface is further configured to send the binding update message to a gateway apparatus of the packet data network.

According to further developments or modifications thereof, one or more of the following applies:

the processor may be configured to include the authentication data in a dedicated information element in the binding update message;

the processor may be configured to include the authentication data in a protocol configuration options information element in the binding update message;

a plurality of information elements may be provided in the binding update message including a password information element, an authentication protocol challenge information element and/or a username information element;.

the processor may be configured to support multiple authentications, and the interface may be configured to send, before receiving the first authentication request, an indication that multiple authentications are supported, wherein the first authentication request may include an indication that multiple authentications are supported;

the interface may be further configured to receive, from the user equipment, a request including an identity of the user equipment; and/or the interface may be further configured to receive a binding update response from the gateway apparatus including configuration parameters, the processor may be configured to create an authentication response including configuration parameters, and the interface may be further configured to send the authentication response to the user equipment.

According to an exemplary seventh aspect of the present invention, there is provided an apparatus comprising an interface configured to receive an a binding update message including identity information and authentication data, the identity information and the authentication data serving for authenticating a user equipment towards a packet data network, and a processor configured to create an access request based on the identity information and authentication data, wherein the interface is further configured to send the access request message to a network authentication element.

According to further developments or modifications thereof, one or more of the following applies:

the authentication data may be included in a dedicated information element in the binding update message;

the authentication data may be included in a protocol configuration options information element in the binding update message;

a plurality of information elements may be provided in the binding update message including a password information element, an authentication protocol challenge information element and/or a username information element; and/or the processor may be further configured to create a binding update response including configuration parameters, and the interface may be configured to send the binding update response in response to the binding update message.

According to an exemplary eighth aspect of the present invention, there is provided a computer program product including a program comprising software code portions being arranged, when run on a processor of an apparatus to perform the method according to the above described fifth, second, third and/or fourth aspects and/or developments or modifications thereof.

According to further developments or modifications thereof, the computer program product according to the eighth aspect comprises a computer-readable medium on which the software code portions are stored, and/or the program is directly loadable into a memory of the processor.

BRIEF DESCRIPTION OF THE DRAWINGS

These and other objects, features, details and advantages will become more fully apparent from the following detailed description of embodiments of the present invention which is to be taken in conjunction with the appended drawings, in which.

DETAILED DESCRIPTION OF EMBODIMENTS

In the following, description will be made to embodiments of the present invention. It is to be understood, however, that the description is given by way of example only, and that the described embodiments are by no means to be understood as limiting the present invention thereto.

The present invention and its embodiments are mainly described in relation to 3GPP specifications being used as non-limiting examples for certain exemplary network configurations and deployments. In particular, the EPS context with an (internal) EPC and an external PDN being accessible by a UE via an untrusted (non-3GPP) access network is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Generally, embodiments of the present invention may be applicable for/in any kind of modern and future communication network including any conceivable mobile/wireless communication networks according to 3GPP (Third Generation Partnership Project) or IETF (Internet Engineering Task Force) specifications.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

In the description of exemplary embodiments of the present invention, an authentication of a user equipment (or the user thereof) towards a network (e.g. EPC, PDN) is construed to be equivalent to an authentication of/for an access of the user equipment (or the user thereof) to/for the respective network e.g. EPC, PDN).

Exemplary embodiments of the present invention, as described hereinafter, are particularly applicable to an evolved packet system according to 3GPP standards.

Figure 1:
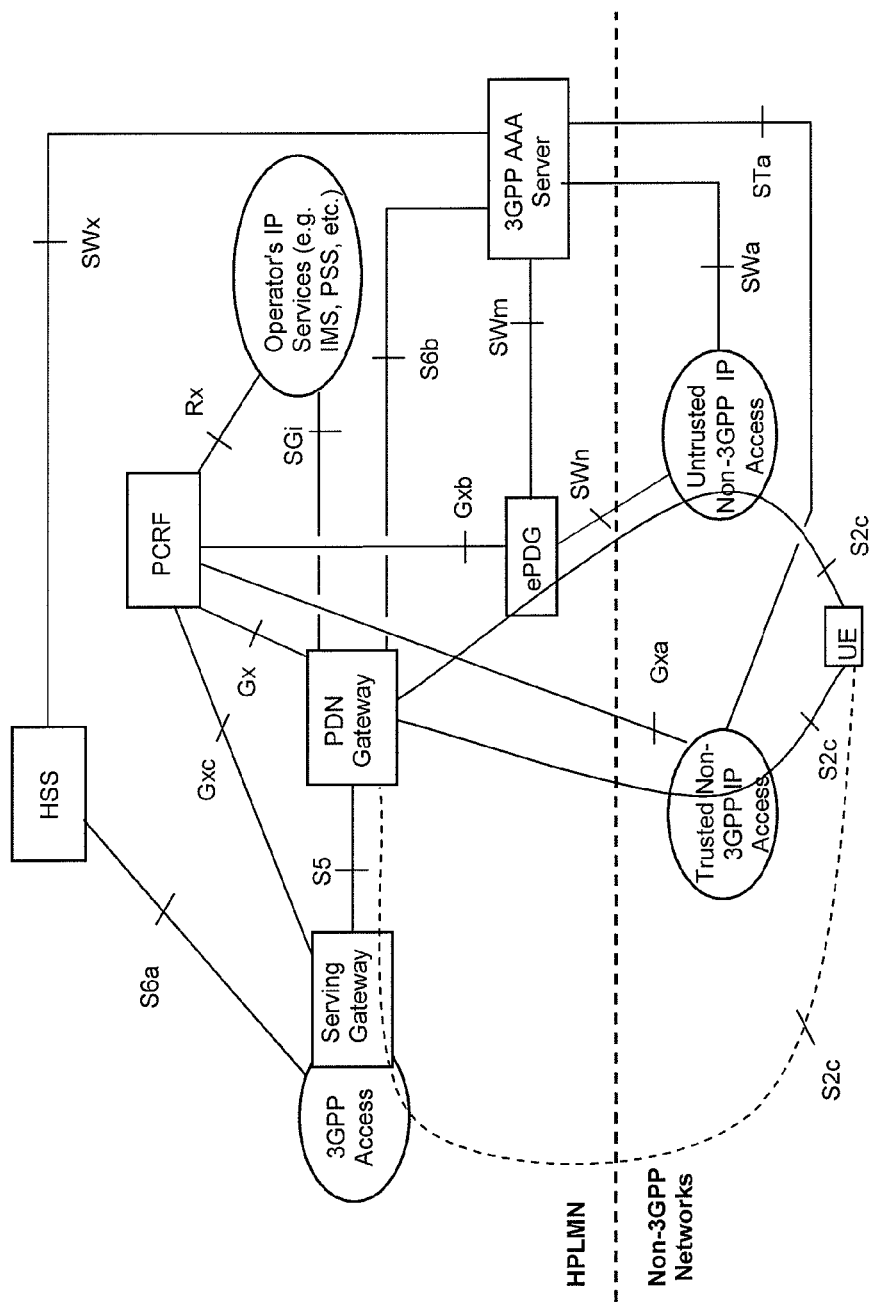
FIGS. 1 and 2 show schematic diagrams illustrating exemplary system architectures of an evolved packet system in which embodiments of the present invention are applicable.
Figure 2:
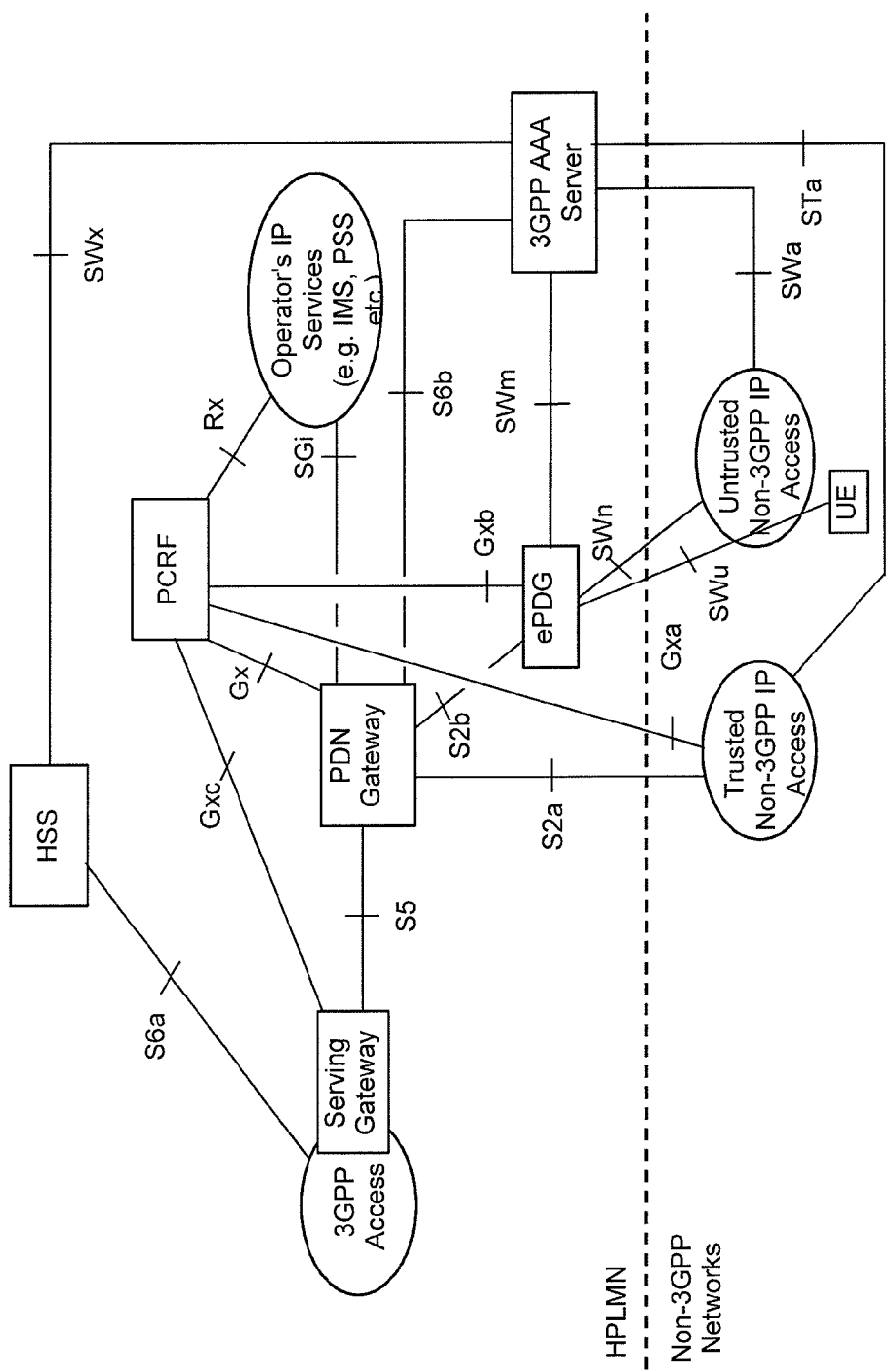

FIGS. 1 and 2 show schematic diagrams illustrating exemplary system architectures of an evolved packet system in which embodiments of the present invention are applicable.

In such an evolved packet system as depicted in FIGS. 1 and 2, a user equipment, such as a WLAN UE, may be attached to an untrusted non-3GPP access network via which it is connected to an evolved packet core (EPC) and an external packet data network (PDN). The EPC and the external PDN (sometimes only referred to as PDN hereinafter) are linked via a PDN Gateway (PGW).

Figure 3:
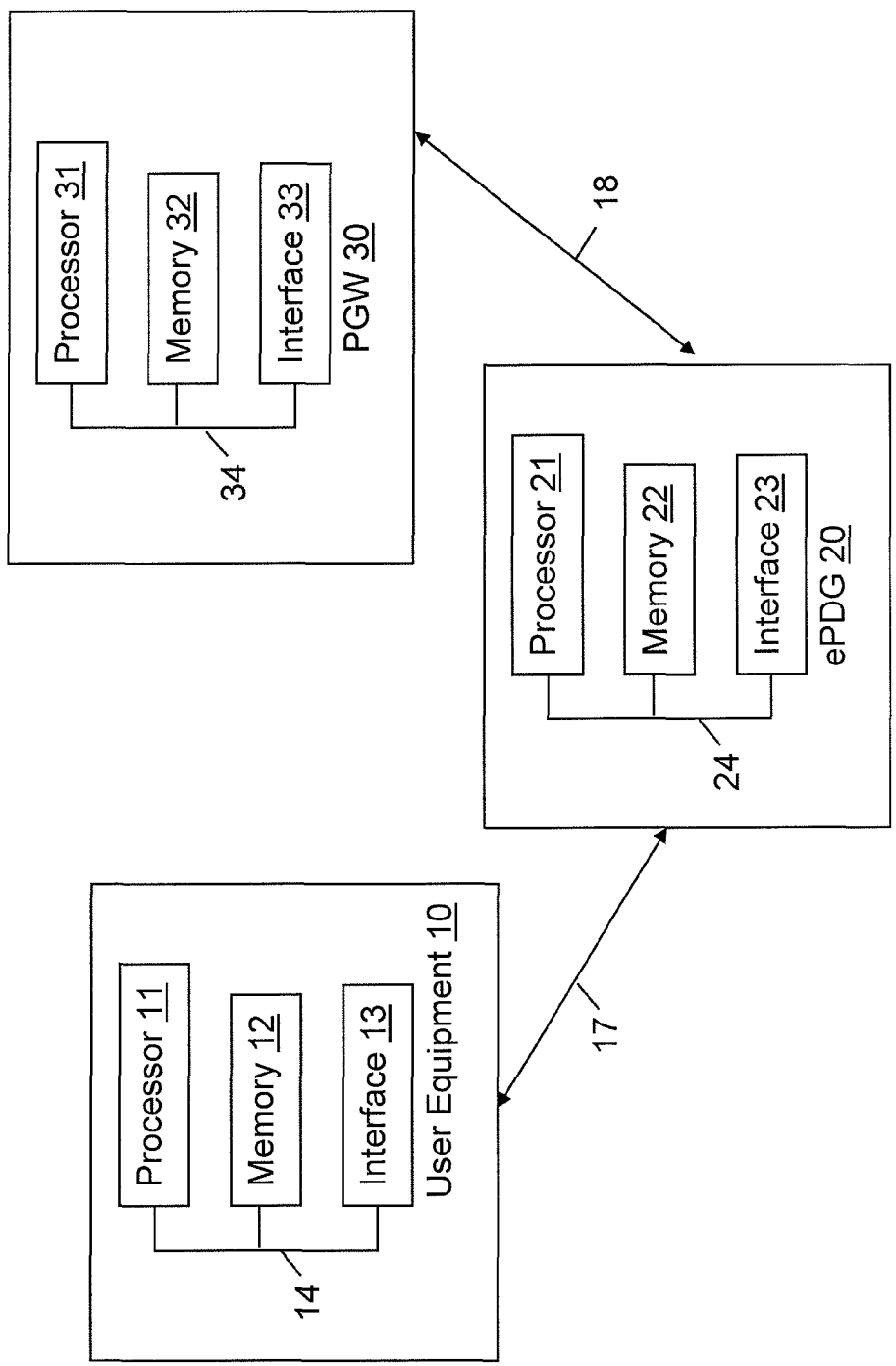
FIG. 3 shows a schematic block diagram illustrating structures of a user equipment, an ePDG and a PGW according to an embodiment of the invention.

As a preliminary matter before exploring details of various implementations, reference is made to FIG. 3 for illustrating simplified block diagrams of various electronic devices that are suitable for use in practicing the exemplary embodiments of this invention.

As shown in FIG. 3, according to an embodiment of the invention a user equipment (UE) 10 comprises a processor 11, a memory 12 and an interface 13 which are connected by a bus 14. A ePDG 20 as an example for a first gateway apparatus comprises a processor 21, a memory 22 and an interface 23 which are connected by a bus 24. A PGW 30 (PDN GW) as an example for a second gateway apparatus 30 comprises a processor 31, a memory 32 and an interface 33 which are connected by a bus 34. The user equipment 10 and the first gateway apparatus are connected through a link 17 which may comprise an SWu interface shown in FIG. 2, and the first gateway apparatus 20 and the second gateway apparatus 30 are connected through a link 18 which may be an S2b interface shown in FIG. 2.

The memories 12, 22 and 32 may store respective programs assumed to include program instructions that, when executed by the associated processors 11, 21 and 31, enable the electronic device to operate in accordance with the exemplary embodiments of this invention. The processors 11, 21 and 31 may also include a modem to facilitate communication over the (hardwire) links 17, 18 and 19 via the interfaces 13, 23, and 33. The interface 13 of the user equipment 10 may further include a suitable radio frequency (RF) transceiver coupled to one or more antennas for bidirectional wireless communications over one or more wireless links with a wireless access network.

Various embodiments of the user equipment 10 may include, but are not limited to, mobile stations, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

In general, the exemplary embodiments of this invention may be implemented by computer software stored in the memories 12, 22 and 32 and executable by the processors 11, 21 and 31, or by hardware, or by a combination of software and/or firmware and hardware in any or all of the devices shown.

The terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and printed electrical connections, as well as by the use of electromagnetic energy, such as electromagnetic energy having wavelengths in the radio frequency region, the microwave region and the optical (both visible and invisible) region, as non-limiting examples.

According to general embodiments of the invention, the processor 11 of the user equipment 10 is configured to create a first authentication request for authenticating a user equipment towards a communication network providing connectivity for the user equipment across an unsecured access network, wherein the authentication request is an authentication request of a key information exchange mechanism and authentication data is inserted in the authentication request. The interface 13 of the user equipment is configured to send the first authentication request for authenticating the user equipment with the communication network based on the authentication data. The processor 11 is further configured to create, after authentication with the communication network, a second authentication request for authenticating the user equipment towards a packet data network external to the communications network from the user equipment. Moreover, the processor 11 is configured to create a binding update message including the authentication data and identity information of the user received from the user equipment. The interface 13 is further configured to send the binding update message to a gateway apparatus (e.g., ePDG 20).

According to general embodiments of the invention, the interface 23 of the first gateway apparatus (e.g., ePDG 20 shown in FIG. 3) is configured to receive a first authentication request for authenticating a user equipment towards a communication network providing connectivity for the user equipment across an unsecured access network, wherein the authentication request is an authentication request of a key information exchange mechanism and includes authentication data. The processor 21 of the first gateway apparatus is configured authenticate the user equipment with the communication network based on the authentication data. The interface 23 is further configured to receive a second authentication request for authenticating the user equipment towards a packet data network external to the communications network from the user equipment. Moreover, the processor 21 is configured to create a binding update message including the authentication data and identity information of the user equipment received from the user equipment, and the interface of the first gateway apparatus is further configured to send the binding update message to a second gateway apparatus of the packet data network (e.g., PGW 30).

Moreover, according to general embodiments of the invention, the interface 33 of the second gateway apparatus (e.g., PGW 30 shown in FIG. 3) is configured to receive a binding update message including identity information and authentication data, the identity information and the authentication data serving for authenticating a user equipment towards a packet data network, and the processor 31 of the second gateway apparatus is configured to create an access request based on the identity information and authentication data. Moreover, the interface of the second gateway apparatus is further configured to send the access request message to a network authentication element.

The authentication data may be user credetential information such as a password (e.g., PAP or CHAP password), an authentication protocol challenge (e.g., PAP or CHAP challenge) and the like. However, the invention is not limited to these specific examples.

Moreover, the key information exchange mechanism described above may be an IKEv2 mechanism. However, the invention is not limited to this specific example.

According to exemplary embodiments of the present invention, it is proposed to use the IKEv2 extension specified in RFC 4739 to transfer the additional authentication parameters between the UE and the ePDG.

Figure 4:
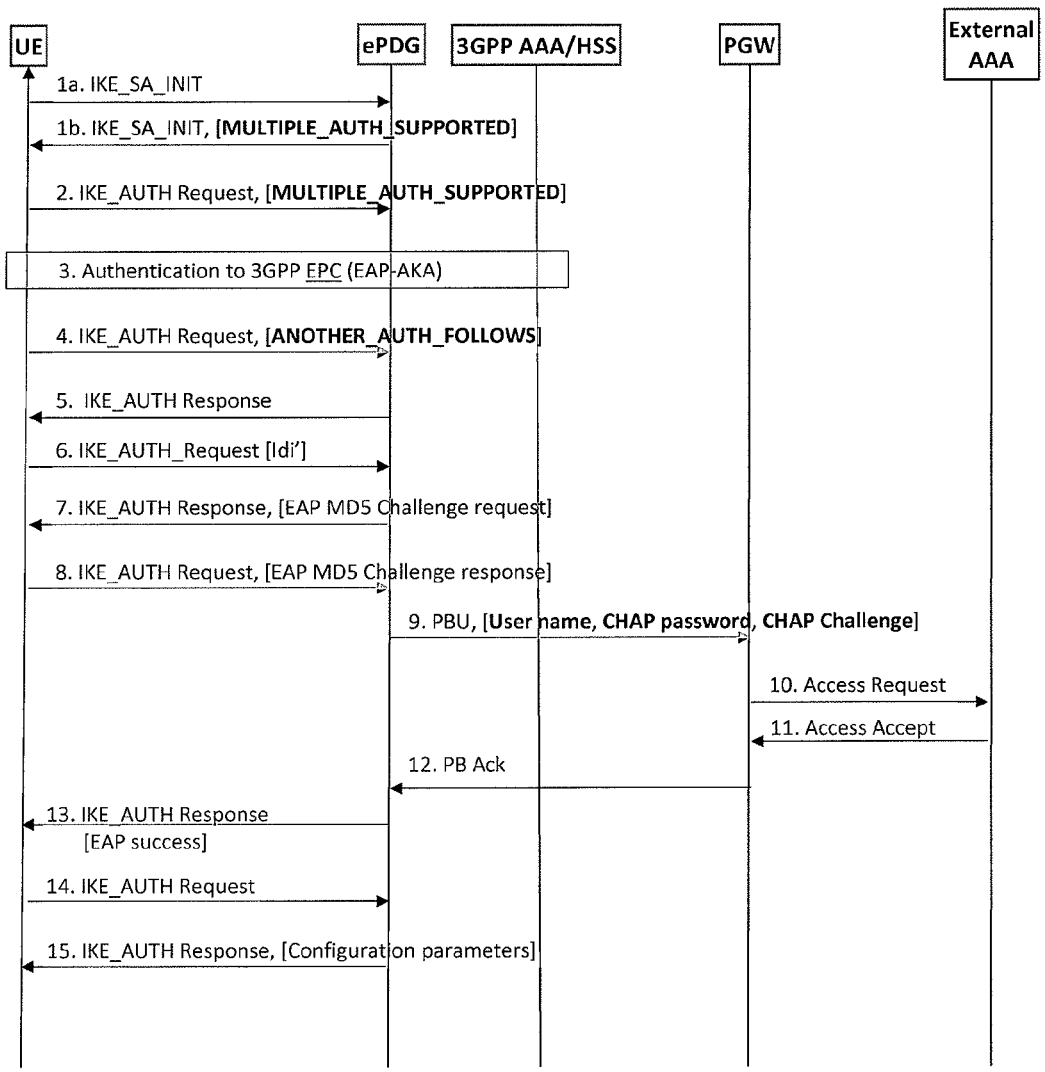
FIG. 4 shows a signalling diagram illustrating signalling between the user equipment, the first gateway apparatus and the second gateway apparatus according to an embodiment of the invention.

The example illustrated in FIG. 4 presents the procedure using CHAP (Challenge handshake authentication protocol) with the external authentication server. The procedure with PAP and EAP would be very similar. The presented example assumes PMIP based S2b, but it can work with GTP based S2b, or another suitable protocol. The invention is not limited to these specific examples.

In step 1, the UE and the ePDG exchange the first pair of messages, known as IKE_SA_INIT. The ePDG includes the indication MULTIPLE_AUTH_SUPPORTED in step 1b.

In step 2, the UE sends the user IKE_AUTH_Request including an indication MULTIPLE_AUTH_SUPPORTED. The ePDG stores the identity received in the IDi payload for later use during step 9.

In step 3, the normal EAP-AKA authentication is performed.

In step 4, the UE sends an IKE_AUTH Request message including an AUTH payload, which authenticates the first IKE_SA_INIT message. The AUTH payload is calculated using the shared key established by the key generating EAP-method used in step 3. The message also includes a Notify payload ANOTHER_AUTH_FOLLOWS indicating to the ePDG that another authentication round will follow.

In step 5, the ePDG checks the correctness of the AUTH received from the UE. The ePDG calculates the response AUTH payload, which authenticates the second IKE_SA_INIT message using the shared key established by the key generating EAP-method used in step 3. Then the AUTH parameter is sent to the UE.

In step 6, the UE sends its identity in the private network in IDi' payload and this identity is to be authenticated and authorized with the external AAA server (in Step 10).

In step 7, if the APN indicated by the IDr payload in step 2 requires an authentication against an external AAA server, and the selected authentication method is CHAP procedure, the ePDG sends an EAP MD5-challenge request to the UE for the next authentication.

In step 8, the UE returns an EAP MD5-Challenge response to the ePDG.

In step 9, the ePDG sends a PBU message to create the PDN connection including the user-name which is copied from the IDi' in the IKE_AUTH Request (step6), CHAP-password and CHAP-Challenge attributes to the PGW. The MN-Identifier option in the PBU contains an identity corresponding to the identity received in the IDi payload in step 2. This is described in more detail below.

In step 10, the PGW sends the access request message with the parameters received in the PBU message to the External AAA server as the RADIUS client.

In step 11, the external AAA server returns the Access accept to the PDG.

In step 12, the PGW sends a PBA message to the ePDG.

In step 13, the EAP success message is sent to the UE over IKEv2.

In step 14, the UE generates the AUTH parameter to authenticate the first IKE_SA_INIT message. The AUTH parameter is sent to the ePDG.

In step 15, the ePDG checks the correctness of the AUTH received from the UE. The ePDG sends the assigned the IP address, and the other configuration parameters to the UE. The IKEv2 negotiation terminates with this step.

Although not illustrated, if in one the above authentication procedures a failure may occur, a corresponding message is sent to the UE and the procedure is terminated.

The above process can be summarized as follows:

A double authentication is performed: the first one is between the UE and network, and the second one is between the UE and an external AAA, which can only be contacted by the PGW.

The authentication data of the second authentication is sent to the ePDG from the UE using an extension of the protocol used for the first authentication.

The authentication data of the second authentication is forwarded from the ePDG to the PGW within Binding Update.

The PGW contacts the external AAA using the authentication data received in step 2 to authenticate the user.

In the following, a specific detail regarding the CHAP authentication is described. In particular, the ePDG is responsible for generating the CHAP Challenge. If the UE is implemented as a so called split-UE (i.e. TE (terminal equipment) and MT (mobile terminal) are separate and PPP (point-to-point protocol) is used to communicate between them), which could theoretically be possible, then some considerations are needed related to the PPP handling. When a bearer setup starts, the TE issues AT-commands to MT, where the used APN (access point name) and PDP (packet data protocol) type are defined.

The MT uses the received APN and PDP type information during the first phase IKEv2 exchange (as per RFC4739) with the ePDG (i.e., during steps 1 to 3 shown in FIG. 4) to establish a connectivity to a proper PGW, APN/PDN and to determine how to populate appropriate configuration payloads for IP configuration in the IKEv2 messages (how the MT fills e.g. configuration payloads determines whether IPv4, IPv6 or IPv4v6 "bearer" gets set up). Setting up the PPP connectivity between the TE and the MT initiates the first phase IKEv2 exchange. The MT knows that the LCP (link control protocol) and later on IPCP/IPV6CP have to be interleaved whatever authentication method takes place during the second phase IKEv2 exchange. The MT actually acts as a "bridge" between IKEv2 initiator and a NAS in PPP. For example:

EAP is used and ePDG proposes EAP-MDS. This translates to MT to send PPP LCP Request-CHAP auth to the TE. The TE either ACKs or NAKs this at LCP level, which then in the MT converts to a proper EAP-Response within IKEv2.

EAP is used and ePDG proposes EAP-GTC. This translates to MT to send PPP LCP Request-PAP auth to the TE. The TE either ACKs or NAKs this at LCP level, which then in the MT converts to a proper EAP-Response within IKEv2.

EAP is used and ePDG proposes an arbitrary EAP method. This translates to MT to send PPP LCP Request-EAP auth to the TE. The TE either ACKs or NAKs this at LCP level, which then in the MT converts to a proper EAP-Response within IKEv2.

Once both IKEv2 phases complete successfully, the IPCP/IPV6CP negotiation may start between the TE and the MT. Note that this step is completely local at this point of time already. The MT just feeds the TE with IP level configuration information it received during the IKEv2 (+PMIPv6) negotiation itself.

According to exemplary embodiments, two alternative methods to transport the (CHAP or PAP) user credential information between the ePDG and PGW in the PBU and PBA messages and corresponding GTPv2 messages are provided:
1. In new information elements.
2. The user credential information is included in the already specified Protocol Configuration Options (PCO) Information elements in PBU/PBA.

The benefit of using the already existing PCO information elements in PBU/PBA according to solution 2 is that the PCO information element has already been specified in 3GPP both in PMIP and GTP. Hence, the solution 2 can easily be implemented.

The benefit of using new information elements according to solution 1 is that no changes to PCO semantics are necessary. Namely, preferably the PCO information element should carry information unchanged between the UE and the PGW. According to solution 2, the ePDG would "translate" the user credential information carried in IKEv2 to user credential information in PMIP PCO. However, the PCO is intended to be an end-to-end signaling between the UE and the PGW. Therefore the PCO creation by the ePDG could be regarded as undesired. Hence, according to solution 1, new information elements are specified in 3GPP, by which the user credential information in the PBU/PBA messages exchanged between the ePDG and PGW is carried. This would require some extension of PMIPv6 and GTPv2, which, however, are easy to implement and to deploy.

The PMIPv6 and GTP information elements needed are:
  CHAP-Password information element
  CHAP-Challenge information element
  PAP-Password information element
  Username information element (note that the identity in this information element can e.g. be different from the MN-Identifier used with PMIPv6)
  CHAP-Password and PAP-Password information elements may be combined, assuming the information element can distinguish between the roles it has been used for.

Moreover, instead of the password information elements described above, an extended password element can be used which is followed by a flag indicating whether this is used as a CHAP password or as a PAP password. This flag is, however, only an example for an indication of the authentication protocol used for the password information element.

In case another authentication protocol is used, the corresponding password can be inserted in the password information element.

According to an aspect of general embodiments of the present invention, an apparatus is provided comprising means for creating a first authentication request for authenticating a user equipment towards a communication network providing connectivity for the user equipment across an unsecured access network, wherein the authentication request is an authentication request of a key information exchange mechanism and authentication data is inserted in the authentication request, means for sending the first authentication request for authenticating the user equipment with the communication network based on the authentication data, means for creating, after authentication with the communication network, a second authentication request for authenticating the user equipment towards a packet data network external to the communications network, and means for sending the second authentication request.

According to a further aspect of general embodiments of the present invention, an apparatus is provided comprising means for receiving an first authentication request for authenticating a user equipment towards a communication network providing connectivity for the user equipment across an unsecured access network, wherein the authentication request is an authentication request of a key information exchange mechanism and includes authentication data, means for authenticating the user equipment with the communication network based on the authentication data, means for receiving a second authentication request for authenticating the user equipment towards a packet data network external to the communications network from the user equipment, means for creating a binding update message including the authentication data and identity information of the user received from the user equipment, and means for sending the binding update message to a gateway apparatus of the packet data network.

According to a further aspect of general embodiments of the present invention, an apparatus is provided means for receiving a binding update message including identity information and authentication data, the identity information and the authentication data serving for authenticating a user equipment towards a packet data network, means for creating an access request based on the identity information and authentication data, and means for sending the access request message to a network authentication element.

It is to be understood that any of the above modifications can be applied singly or in combination to the respective aspects and/or embodiments to which they refer, unless they are explicitly stated as excluding alternatives.

For the purpose of the embodiments of the present invention as described herein above, it should be noted that
  method steps likely to be implemented as software code portions and being run using a processor at a network element or terminal (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the invention in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above, such as UE, ePDG, PGW etc. as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined apparatuses, or any one of their respective means) can be implemented as individual devices, units or means, but this does not exclude that they are implemented in a distributed fashion throughout the system, as long as the functionality of the device, unit or means is preserved;

an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

It is noted that the embodiments and examples described above are provided for illustrative purposes only and are in no way intended that the present invention is restricted thereto. Rather, it is the intention that all variations and modifications be included which fall within the spirit and scope of the appended claims.

We claim:

1. A method, comprising:
receiving an indication that multiple authentications are supported;
creating a first authentication request for authenticating a user equipment towards a communication network providing connectivity for the user equipment across an unsecured access network, wherein the first authentication request is an authentication request of a key information exchange mechanism and authentication data is inserted in the authentication request;
inserting in the first authentication request the indication that multiple authentications are supported;
sending the first authentication request for authenticating the user equipment with the communication network based on the authentication data;
creating, after authentication with the communication network, a second authentication request for authenticating the user equipment towards a packet data network external to the communications network; and
sending the second authentication request,
wherein the second authentication request comprises additional authentication parameters further comprising at least one flag indicating whether the additional authentication parameters are associated with a challenge handshake authentication protocol or password authentication protocol password, wherein the additional authentication parameters are included only within dedicated information elements other than Protocol Configuration Options Information elements, and wherein information included in the Protocol Configuration Options Information elements remains unchanged, and
wherein the additional authentication parameters are received from the user equipment by using an Internet Key Exchange version 2 (IKEv2) extension specified in Request for Comments (RFC) 4739.

2. A method, comprising:
sending an indication that multiple authentication are supported;
receiving an first authentication request for authenticating a user equipment towards a communication network providing connectivity for the user equipment across an unsecured access network, wherein the first authentication request is an authentication request of a key information exchange mechanism and comprises authentication data, and the first authentication request comprises the indication that multiple authentications are supported;
authenticating the user equipment with the communication network based on the authentication data;
receiving a second authentication request for authenticating the user equipment towards a packet data network external to the communications network from the user equipment comprising at least one flag indicating whether additional authentication parameters are associated with a challenge handshake authentication protocol or password authentication protocol password;
creating a binding update message comprising the authentication data and identity information of the user received from the user equipment by using an Internet Key Exchange version 2 (IKEv2) extension specified in Request for Comments (RFC) 4739; and
sending the binding update message to a gateway apparatus of the packet data network,
wherein the binding update message comprises the authentication data and identity information of the user which are included only within dedicated information elements other than Protocol Configuration Options Information elements, and wherein information included in the Protocol Configuration Options Information elements remains unchanged.

3. The method according to claim 2, wherein a plurality of information elements is provided in the binding update message comprising an password information element, an authentication protocol challenge information element and/or a username information element.

4. A method, comprising:
receiving a binding update message comprising identity information and authentication data, the identity information and the authentication data serving for authenticating a user equipment towards a packet data network, and a mobile node-identifier option in the binding update message contains an identity received in an identification—initiator payload;

creating an access request based on the identity information and authentication data;

sending the access request message to a network authentication element;

receiving at least one access accept message from the network authentication element; and transmitting at least one proxy binding acknowledgement message to at least one evolved packet data gateway, wherein the authentication data is included only within a dedicated information element other than in Protocol Configuration Options Information elements in the binding update message, and wherein information included in the Protocol Configuration Options Information elements remains unchanged.

5. A method, comprising:

sending, from a user equipment to a first gateway apparatus, a first authentication request for authenticating a user equipment towards a communication network providing connectivity for the user equipment across an unsecured access network, wherein the first authentication request is an authentication request of a key information exchange mechanism and comprises authentication data;

authenticating the user equipment with the communication network based on the authentication data;

sending, from the user equipment to the first gateway apparatus, a second authentication request for authenticating the user equipment towards a packet data network external to the communications network comprising at least one flag indicating whether additional authentication parameters are associated with a challenge handshake authentication protocol or password authentication protocol password;

creating a binding update message comprising the authentication data and identity information of the user received from the user equipment by using an Internet Key Exchange version 2 (IKEv2) extension specified in Request for Comments (RFC) 4739, and a mobile node-identifier option in the binding update message contains an identity received in an identification—initiator payload; and sending the binding update message from the first gateway apparatus to a second gateway apparatus of the packet data network, wherein the binding update message comprises the authentication data and identity information of the user which are included only within dedicated information elements other than Protocol Configuration Options Information elements, and wherein information included in the Protocol Configuration Options Information elements remains unchanged.

6. An apparatus, comprising:

a processor configured to receive an indication that multiple authentications are supported;

the processor is further configured to create a first authentication request for authenticating a user equipment towards a communication network providing connectivity for the user equipment across an unsecured access network, wherein the first authentication request is an authentication request of a key information exchange mechanism and authentication data is inserted in the authentication request;

the processor is further configured to insert in the first authentication request the indication that multiple authentications are supported; and an interface configured to send the first authentication request for authenticating the user equipment with the communication network based on the authentication data, wherein the processor is further configured to create, after authentication with the communication network, a second authentication request for authenticating the user equipment towards a packet data network external to the communications network, wherein the interface is further configured to send the second authentication request, wherein the second authentication request comprises additional authentication parameters further comprising at least one flag indicating whether the additional authentication parameters are associated with a challenge handshake authentication protocol or password authentication protocol password, wherein the additional authentication parameters are included only within dedicated information elements other than Protocol Configuration Options Information elements, and wherein information included in the Protocol Configuration Options Information elements remains unchanged, and wherein the additional authentication parameters are received from the user equipment by using an Internet Key Exchange version 2 (IKEv2) extension specified in Request for Comments (RFC) 4739.

7. An apparatus, comprising:

an interface configured to send an indication that multiple authentications are supported, wherein the interface is further configured to receive a first authentication request for authenticating a user equipment towards a communication network providing connectivity for the user equipment across an unsecured access network, wherein the authentication request is an authentication request of a key information exchange mechanism and includes authentication data, and wherein the first authentication request comprises the indication that multiple authentications are supported; and a processor configured to authenticate the user equipment with the communication network based on the authentication data, wherein the processor is configured to support multiple authentications, wherein the interface is further configured to receive a second authentication request for authenticating the user equipment towards a packet data network external to the communications network from the user equipment comprising at least one flag indicating whether additional authentication parameters are associated with a challenge handshake authentication protocol or password authentication protocol password, wherein the processor is further configured to create a binding update message comprising the authentication data and identity information of the user equipment received from the user equipment by using an Internet Key Exchange version 2 (IKEv2) extension specified in Request for Comments (RFC) 4739, wherein the interface is further configured to send the binding update message to a gateway apparatus of the packet data network, and wherein the binding update message comprises the authentication data and identity information of the user which are included only within dedicated information elements other than Protocol Configuration Options Information elements, and wherein information included in the Protocol Configuration Options Information elements remains unchanged.

8. The apparatus according to claim 7, wherein a plurality of information elements is provided in the binding update message including a password information element, an authentication protocol challenge information element and/or a username information element.

9. An apparatus, comprising:
an interface configured to receive an a binding update message comprising identity information and authentication data, the identity information and the authentication data serving for authenticating a user equipment towards a packet data network, and a mobile node-identifier option in the binding update message contains an identity received in an identification—initiator payload; and
a processor configured to create an access request based on the identity information and authentication data,
wherein the interface is further configured to send the access request message to a network authentication element,
wherein the interface is further configured to receive at least one access accept message from the network authentication element,
wherein the interface is further configured to transmit at least one proxy binding acknowledgement message to at least one evolved packet data gateway, and
wherein the authentication data is included only within a dedicated information element other than Protocol Configuration Options Information elements in the binding update message, and wherein information included in the Protocol Configuration Options Information elements remains unchanged.

10. A computer program, embodied on a non-transitory computer readable medium, comprising software code portions being arranged, when run on a process of an apparatus, to perform:
receiving an indication that multiple authentications are supported;
creating a first authentication request for authenticating a user equipment towards a communication network providing connectivity for the user equipment across an unsecured access network, wherein the first authentication request is an authentication request of a key information exchange mechanism and authentication data is inserted in the authentication request;
inserting in the first authentication request the indication that multiple authentications are supported;
sending the first authentication request for authenticating the user equipment with the communication network based on the authentication data;
creating, after authentication with the communication network, a second authentication request for authenticating the user equipment towards a packet data network external to the communications network; and
sending the second authentication request,
wherein the second authentication request comprises additional authentication parameters further comprising at least one flag indicating whether the additional authentication parameters are associated with a challenge handshake authentication protocol or password authentication protocol password, wherein the additional authentication parameters are included only within dedicated information elements other than Protocol Configuration Options Information elements, and wherein information included in the Protocol Configuration Options Information elements remains unchanged, and
wherein the additional authentication parameters are received from the user equipment by using an Internet Key Exchange version 2 (IKEv2) extension specified in Request for Comments (RFC) 4739.

11. A computer program, embodied on a non-transitory computer readable medium, comprising software code portions being arranged, when run on a process of an apparatus, to perform:
sending an indication that multiple authentication are supported;
receiving an first authentication request for authenticating a user equipment towards a communication network providing connectivity for the user equipment across an unsecured access network, wherein the first authentication request is an authentication request of a key information exchange mechanism and includes authentication data, and the first authentication request comprises the indication that multiple authentications are supported;
authenticating the user equipment with the communication network based on the authentication data;
receiving a second authentication request for authenticating the user equipment towards a packet data network external to the communications network from the user equipment comprising at least one flag indicating whether additional authentication parameters are associated with a challenge handshake authentication protocol or password authentication protocol password;
creating a binding update message comprising the authentication data and identity information of the user received from the user equipment by using an Internet Key Exchange version 2 (IKEv2) extension specified in Request for Comments (RFC) 4739; and
sending the binding update message to a gateway apparatus of the packet data network,
wherein the binding update message comprises the authentication data and identity information of the user which are included only within dedicated information elements other than Protocol Configuration Options Information elements, and wherein information included in the Protocol Configuration Options Information elements remains unchanged.

12. A computer program, embodied on a non-transitory computer readable medium, comprising software code portions being arranged, when run on a process of an apparatus, to perform:
receiving a binding update message comprising identity information and authentication data, the identity information and the authentication data serving for authenticating a user equipment towards a packet data network, and a mobile node-identifier option in the binding update message contains an identity received in an identification—initiator payload;
creating an access request based on the identity information and authentication data;
sending the access request message to a network authentication element;
receiving at least one access accept message from the network authentication element; and
transmitting at least one proxy binding acknowledgement message to at least one evolved packet data gateway,
wherein the authentication data is included only within a dedicated information element other than in Protocol Configuration Options Information element in the binding update message, and wherein information included in the Protocol Configuration Options Information element remains unchanged.

13. A computer program, embodied on a non-transitory computer readable medium, comprising software code portions being arranged, when run on a process of an apparatus, to perform:

sending, from a user equipment to a first gateway apparatus, a first authentication request for authenticating a user equipment towards a communication network providing connectivity for the user equipment across an unsecured access network, wherein the first authentication request is an authentication request of a key information exchange mechanism and comprises authentication data;

authenticating the user equipment with the communication network based on the authentication data;

sending, from the user equipment to the first gateway apparatus, a second authentication request for authenticating the user equipment towards a packet data network external to the communications network further comprising at least one flag indicating whether additional authentication parameters are associated with a challenge handshake authentication protocol or password authentication protocol password;

creating a binding update message comprising the authentication data and identity information of the user received from the user equipment by using an Internet Key Exchange version 2 (IKEv2) extension specified in Request for Comments (RFC) 4739, and a mobile node-identifier option in the binding update message contains an identity received in an identification—initiator payload; and sending the binding update message from the first gateway apparatus to a second gateway apparatus of the packet data network, wherein the binding update message comprises the authentication data and identity information of the user which are included only within dedicated information elements other than Protocol Configuration Options Information elements, and wherein information included in the Protocol Configuration Options information elements remains unchanged.

* * * * *